United States Patent [19]

Ohkouchi et al.

[11] Patent Number: 5,607,578
[45] Date of Patent: Mar. 4, 1997

[54] FILTER SYSTEM FOR AN IN-TANK FUEL PUMP

[75] Inventors: Kousaku Ohkouchi; Shigeru Yoshida; Kenji Hayashi; Shigeru Arakawa, all of Obu, Japan

[73] Assignee: Aisan Kogyo Kabushiki Kaisha, Obu, Japan

[21] Appl. No.: 549,907

[22] Filed: Oct. 30, 1995

Related U.S. Application Data

[63] Continuation of Ser. No. 238,866, May 6, 1994, abandoned.

[30] Foreign Application Priority Data

May 6, 1993 [JP] Japan .................................. 5-105477
May 12, 1993 [JP] Japan .................................. 5-110588

[51] Int. Cl.⁶ .......................................... B01D 35/027
[52] U.S. Cl. ..................... 210/172; 210/416.4; 210/455; 210/461; 210/486
[58] Field of Search ........................... 210/172, 416.4, 210/455, 459, 460, 461, 486, 499

[56] References Cited

U.S. PATENT DOCUMENTS

| | | | |
|---|---|---|---|
| 4,402,827 | 9/1983 | Joseph | 210/461 |
| 4,966,522 | 10/1990 | Koyama | 210/172 |
| 5,055,187 | 10/1991 | Ito et al. | 210/461 |
| 5,409,608 | 4/1995 | Yoshida et al. | 210/461 |

FOREIGN PATENT DOCUMENTS

180694  5/1989  Japan .

*Primary Examiner*—Matthew O. Savage
*Attorney, Agent, or Firm*—Dennison, Meserole, Pollack & Scheiner

[57] ABSTRACT

A filter for an in-tank type fuel pump. The filter comprises a frame, a bag type screen adapted to be kept in an expanded condition by the frame, and a flat protector to be interposed between the screen and a bottom surface of the fuel tank. The protector is attached to the screen substantially at the central portion of the protector in the longitudinal direction thereof, so that it may be pressed against the tank bottom surface by a small deflecting force of the screen. This construction is effective to cause less transmission of noise of the pump to the tank.

6 Claims, 8 Drawing Sheets

FILTER SYSTEM FOR AN IN-TANK FUEL PUMP

This is a continuation of application Ser. No. 08/238,866 filed on May 6, 1994, now abandoned.

BACKGROUND OF THE INVENTION

1. Field of the Invention

The present invention relates to a filter for an in-tank type fuel pump to be used in a vehicle.

2. Description of the Prior Art

Figure 8A:
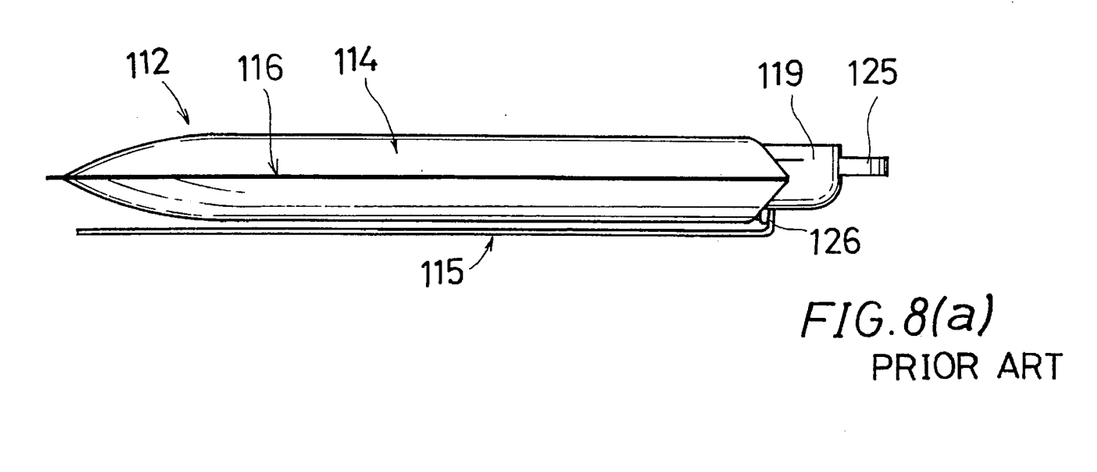
FIGS. 8(a) and 8(b) are views illustrating a prior art filter.
Figure 8B:
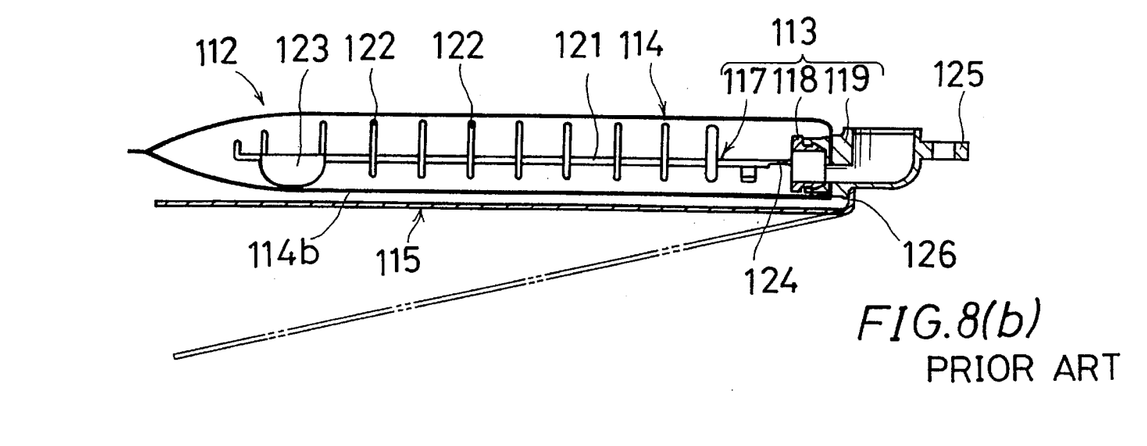
Figure 9:
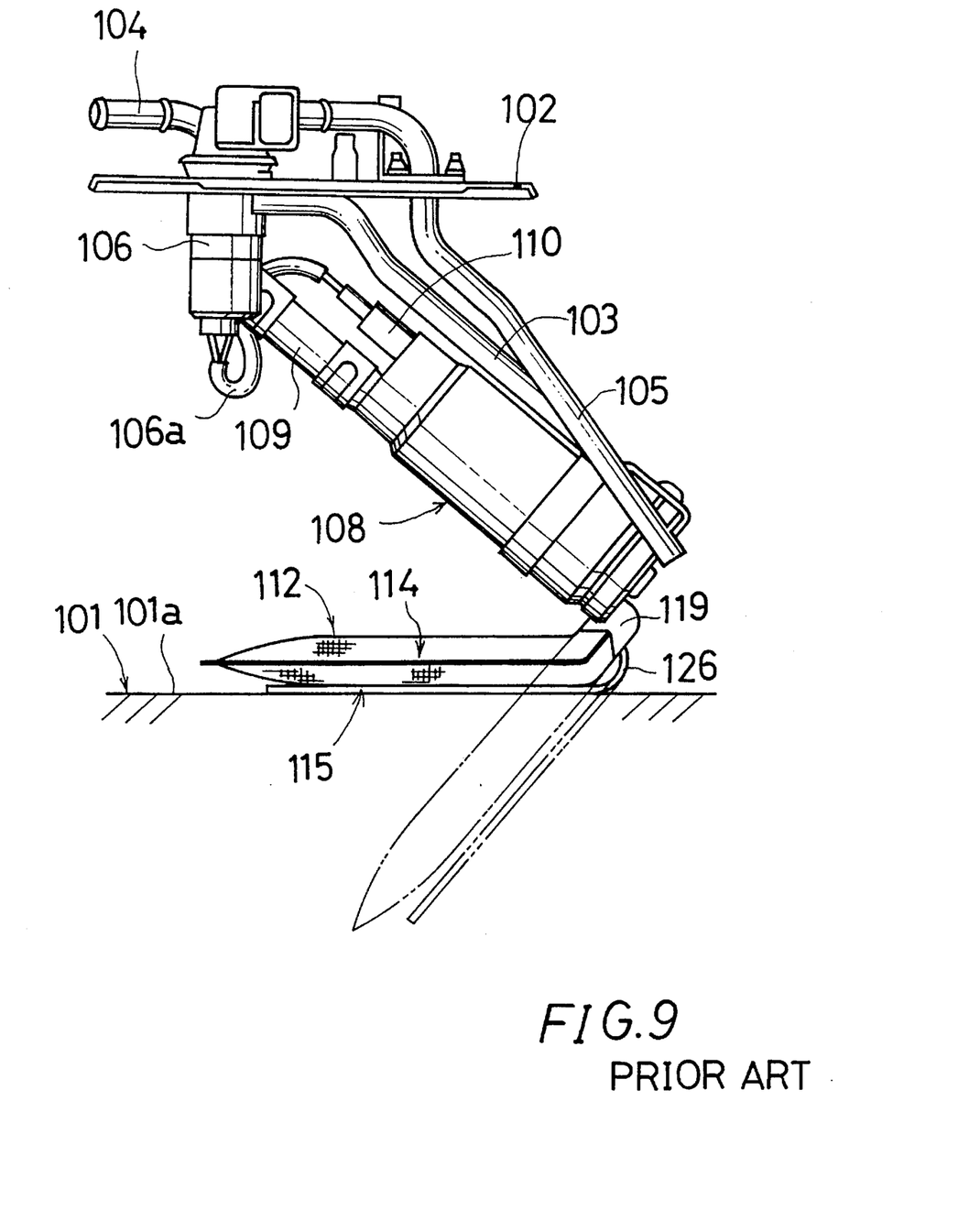
FIG. 9 is a side elevational view of a pump assembly incorporating the prior art filter in FIG. 8.

A prior art will be described with reference to FIGS. 8 and 9. FIG. 8(a) is a side elevational view of a filter, and FIG. 8(b) is a sectional view thereof. FIG. 9 is a side elevational view of a pump assembly including the filter disposed in a fuel tank.

As seen in FIG. 9, the pump assembly includes a bracket 102 mounted on a fuel tank 101 so as to close an upper opening thereof and carrying a pump supporting stay 103, a fuel feeding pipe 104, a return pipe 105 and a connector 106 for electrical connection.

An electrically operated fuel pump (also referred to as a fuel pump) 108 is an integral combination of an electric motor such as a brushless motor or a D.C. motor and a pump section driven by the motor, and is supported in a slant manner by the pump supporting stay 103.

The fuel pump 108 has in the upper surface thereof a discharge port (not shown) to which is connected the fuel feeding pipe 104 through a connecting hose 109, and is provided on the upper surface thereof with a terminal 110 to which a harness 106a of the connector 106 is electrically connected. Furthermore, the fuel pump 108 has on the bottom surface thereof a suction port (not shown) to which is attached a filter 112 which will be mentioned later.

The pump assembly thus constructed is disposed in the fuel tank 101 in the following manner. Specifically, the fuel pump 108 and other components are inserted into the fuel tank 101 through the opening in the upper surface to be immersed in fuel in the tank, and the bracket 102 is fixed so as to close the opening. Though not illustrated, a pipe for feeding fuel to an engine is connected to the fuel feeding pipe 104, and another pipe for returning excess fuel from the engine to the tank is connected to the return pipe 105. A harness to be coupled to an electric circuit including a power source is connected to the connector 106.

The fuel pump 108 thus disposed in the fuel tank 101 is operated to suck fuel in the fuel tank 101 through the filter which is supplied through the fuel feeding pipe 104 to the engine.

Now, the description will be related to the filter 112 assembled to the pump assembly with reference to FIGS. 8 and 9.

The filter 112 includes a frame 113 to be mounted on the fuel pump 108, a bag type screen 114 to be kept in an expanded condition by the frame 113, and a flat protector 115 to be interposed between the screen 114 and a bottom surface 101a of the fuel tank 101.

The frame 113 is made of a synthetic resin material such as a nylon resin, and composed of an inner skeleton 117 inserted in the screen 114, a cylindrical connecting pipe 118 integrally formed with an end of the skeleton 117 and an elbow type mounting pipe 119 to which the connecting pipe 118 is attached through snap fitting or the like. The inner skeleton 117 is provided with a band type main plate 121, holding pieces 122 projecting vertically from the upper and lower surfaces of the main plate at regular intervals, a presser portion 123 provided at the extreme end of the main plate 121 and projecting from the lower surface thereof, and a thin portion 124 formed in the main plate 121 in the vicinity of the connecting pipe 118. The mounting pipe 119 is formed with a fixing piece 125 to be clipped onto a pump body of the fuel pump 108.

The screen 114 is made of a synthetic resin material such as a nylon resin in the form of a mesh suitable to filter fuel and has good flexibility. The screen 114 is formed into a bag by inserting the central portion of a fold edge of the screen 114 which is folded in half in the mounting pipe 119, securing the connecting pipe 118 of the inner skeleton 117 to the mounting pipe 119, and welding the peripheral edges of the screen together.

The protector 115 is a substantially rectangular thin plate made of a synthetic resin material such as a nylon resin. The protector 115 is provided at an end thereof with a mounting piece 126 to be mounted on the mounting pipe 119 of the frame 113.

The filter 112 is mounted on the fuel pump 108 by fitting the mounting pipe 119 to the suction port of the fuel pump 108 and clipping the fixing piece 125 onto the pump body, as shown in FIG. 9. It should be noted that the filter 112 prior to installation in the fuel tank 101 extends substantially at right angles with respect to the fuel pump 108 as shown by phantom lines in FIG. 9.

On installation of the pump assembly in the fuel tank 101, the filter 112 is forcedly bent as shown by solid lines in FIG. 9. At this time, as the frame 113 is bent at the thin portion 124, both the screen 114 and the protector 115 are also bent. This causes the lower surface of the screen 114 to be pressed against the tank bottom surface 101a with the protector 115 interposed therebetween. The protector 115 is provided for elimination or reduction of abrasion of the lower surface of the screen 114.

In such a prior art filter 112, the mounting piece 126 of the protector 115 is used to mount the protector 115 on the mounting pipe 119 of the frame 113.

Thus, when disposed in the fuel tank 101, the protector 115 is deformed by bending. This results in a strong force applied by the protector 115 against the tank bottom surface 101a, and consequently, vibration generated through operation of the fuel pump 108 is apt to be transmitted through the protector 115 to the fuel tank 101, causing increased vibrational noise. The force by which the whole filter presses the bottom surface 101a of the fuel tank 101 is equal to the sum of the bending forces of the frame 113, of the screen 114 and of the protector 115.

Prior to installation, the protector 115 is apt to open or to extend apart from the screen 114 as shown by phantom lines in FIG. 8(b), causing reduction in the efficiency of operation with regard to assembling of the fuel pump 108, insertion of the fuel pump 108 into the fuel tank 101 and others operations.

Furthermore, the prior art filter 112 has an upper mesh portion and a lower mesh portion adhered to each other along a line 116 which is at a level substantially corresponding to a half of the full height of the filter 112, resulting in little allowance of the membrane length of the lower mesh portion 114b left.

Thus, when the filter 112 is bent to be installed in the fuel tank 101, vibration may cause the holding pieces 122 of the inner skeleton 117 of the frame 113 to stretch the lower mesh portion 114b, with the inner skeleton 117 supported by the lower mesh portion 114b. This will disturb bending of the inner skeleton 117 and often cause engagement of the central portion of the bent inner skeleton 117 against the protector 115, with the presser portion 123 floating above the protector 115.

Such engagement of the central portion of the inner skeleton 117 against the protector 115 decreases the distance from the engagement point to the filter bending point, resulting in increase of the force applied by the filter 112 against the tank bottom surface 101a. Thus, vibration generated by operation of the fuel pump 108 will be more readily transmitted to the fuel tank 101, causing increased noise.

SUMMARY OF THE INVENTION

A primary object of the invention is to provide a filter for a fuel pump which can decrease the vibrational noise and improve the efficiency of assembling operation or the like.

Another object of the invention is to provide a filter for a fuel pump which can avoid increase of pressing load applied by a frame against a tank bottom surface so as to reduce the noise.

According to the present invention, there is provided a filter for an in-tank type fuel pump comprising a frame to be mounted on the fuel pump, a bag type screen adapted to be kept in an expanded condition by the frame, and a flat protector to be interposed between the screen and the bottom surface of a fuel tank. The protector is attached to the screen substantially at the central portion of the protector in the longitudinal direction thereof.

The present invention will be more fully understood from the following detailed description and appended claims when taken with the accompanied drawings.

DETAILED DESCRIPTION OF THE PREFERRED EMBODIMENT

Figure 4:
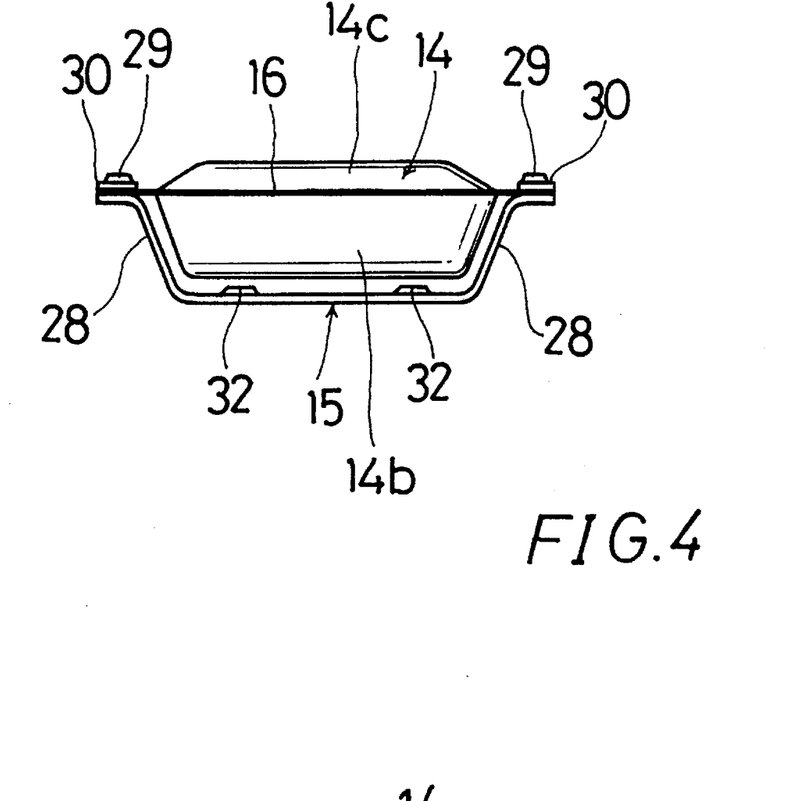
FIG. 4 is a front view of the filter in FIG. 1.
Figure 5:
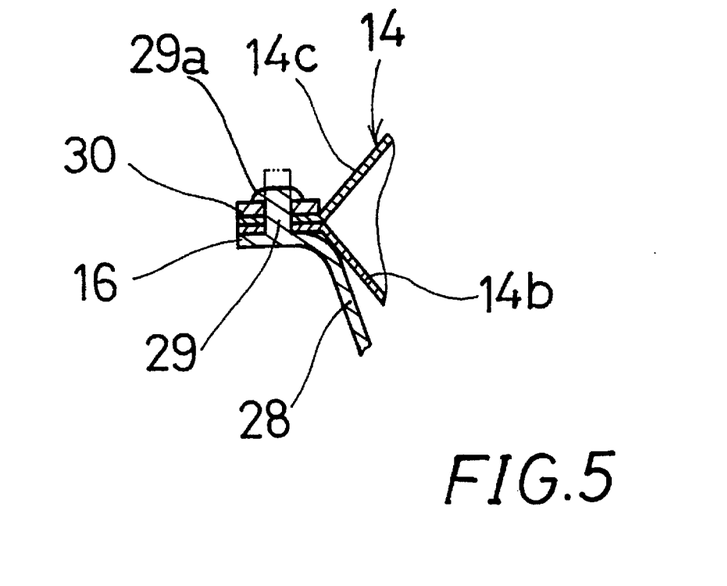
FIG. 5 is a sectional view illustrating the attachment of the protector.
Figure 6:
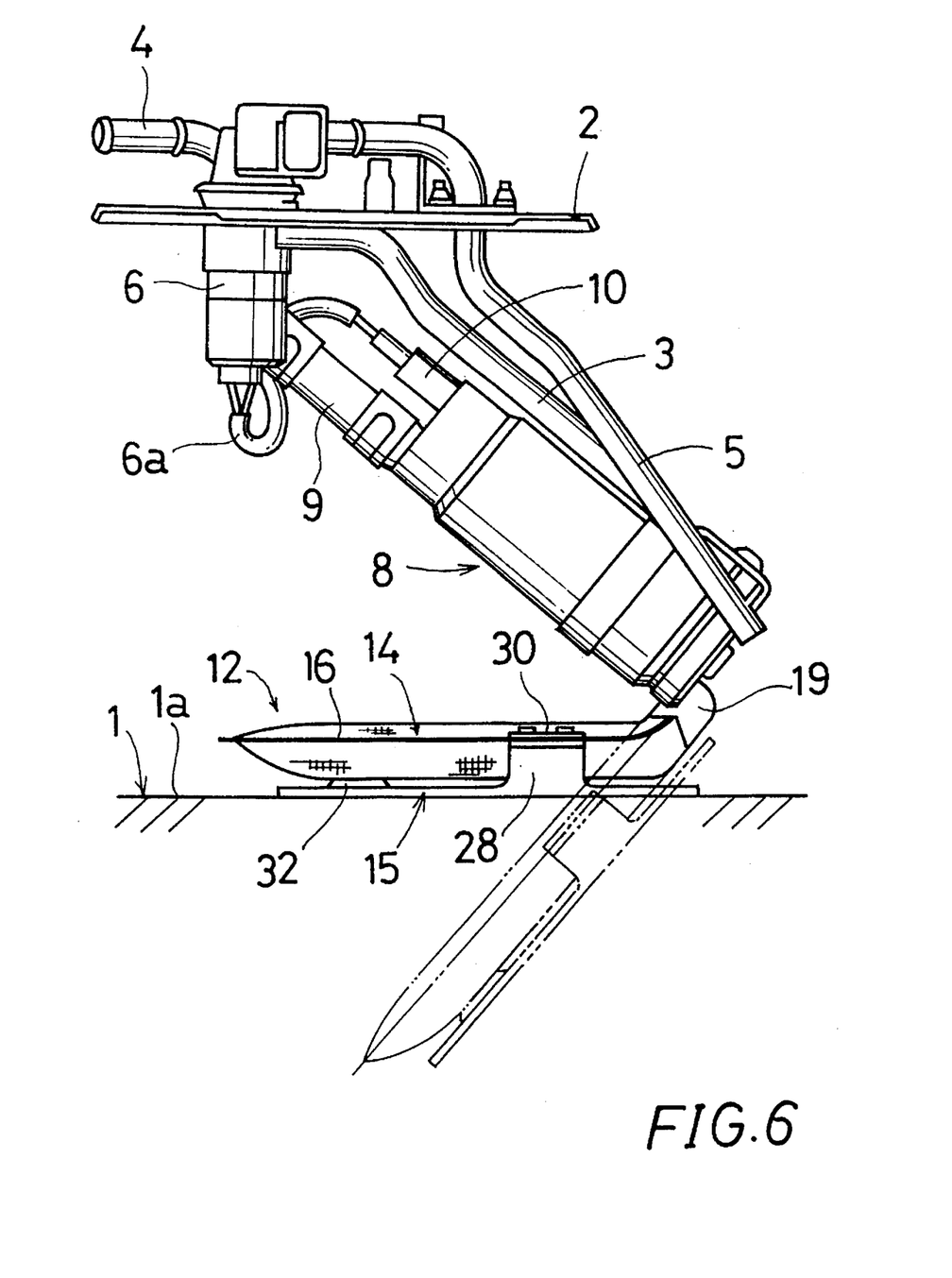
FIG. 6 is a side elevational view of a pump assembly incorporating the filter in FIG. 1.
Figure 7:
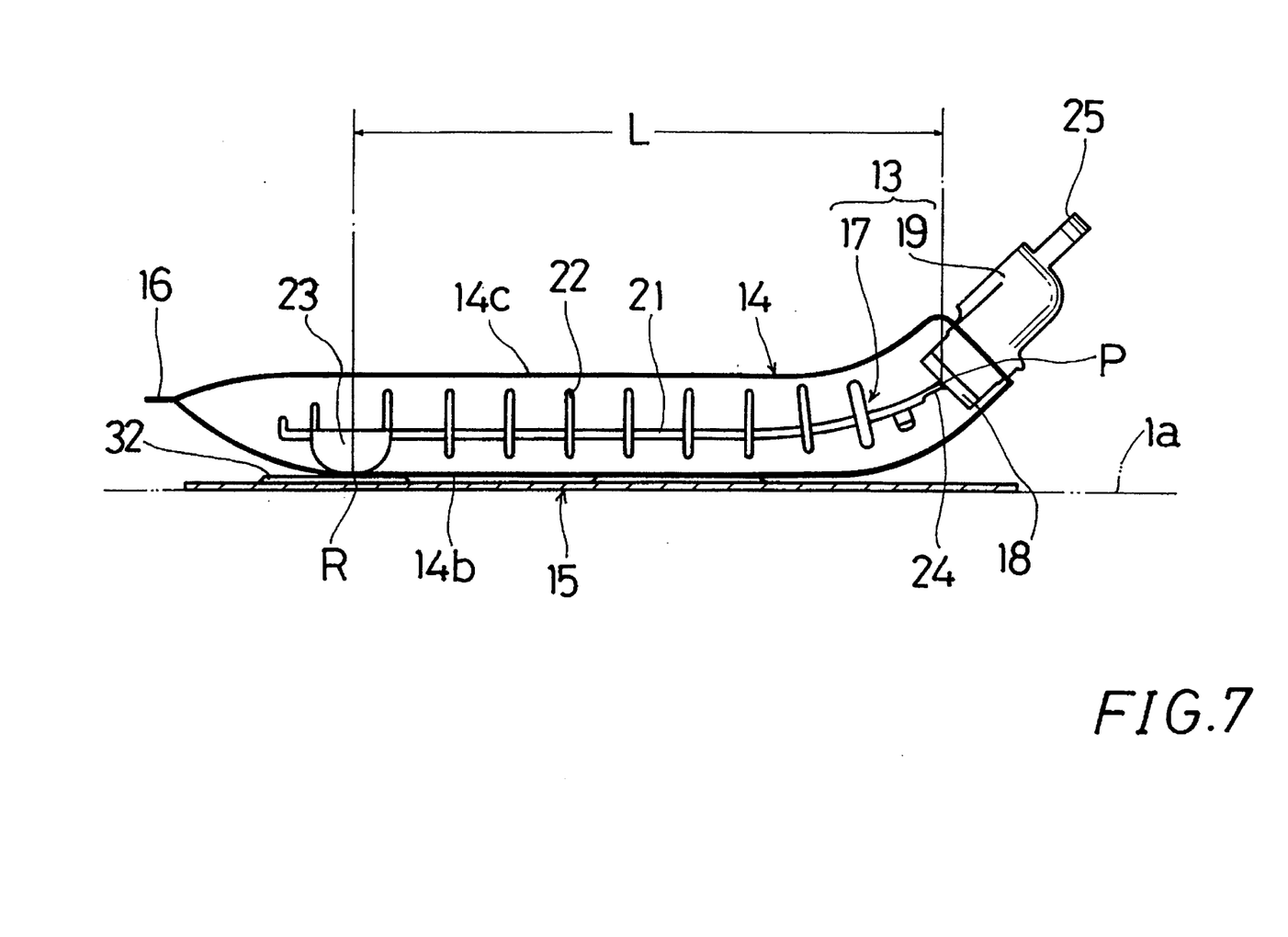
FIG. 7 is a view illustrating the filter arranged for use.

Now, an embodiment of the present invention will be described with reference to FIGS. 1 to 7. FIG. 6 is a side elevational view of a pump assembly. A bracket 2 is mounted on a fuel tank 1 so as to close an upper opening thereof, and a stay 3 is secured to the lower surface of the bracket 2 in a slant manner. The bracket 2 carries the pump supporting stay 3, a fuel feeding pipe 4, a return pipe 5 and a connector 6 for electrical connection. An in-tank type electrically operated fuel pump (also referred to as a fuel pump) 8 is supported in a slant manner by the stay 3. The fuel pump 8 is an integral combination of an electric motor such as a brushless motor or a D.C. motor and a pump section driven by the motor. The fuel pump 8 has a fuel discharge port (not shown) which is connected to the fuel feeding pipe 4 through a connecting hose 9. The fuel pump 8 is provided with a terminal 10 to which a harness 6a of the connector 6 is electrically connected. Furthermore, the fuel pump 8 has on the bottom surface thereof a fuel suction port (not shown) to which is attached a filter 12 which will be mentioned later.

The pump assembly thus constructed is disposed in the fuel tank 1 in the following manner. Specifically, the fuel pump 8 and its peripheral components are inserted into the fuel tank 1 through the opening in the upper surface, and the bracket 2 is fixed so as to close the opening. Though not illustrated, a pipe for feeding fuel to an engine is connected to the fuel feeding pipe 4, and another pipe for returning excess fuel from the engine to the tank is connected to the return pipe 5. A harness to be coupled to an electric circuit including a power source is connected to the connector 6. The fuel pump 8 is operated to suck fuel in the fuel tank 1 through the filter 12 which is supplied through the fuel feeding pipe 4 to the engine.

Figure 1A:
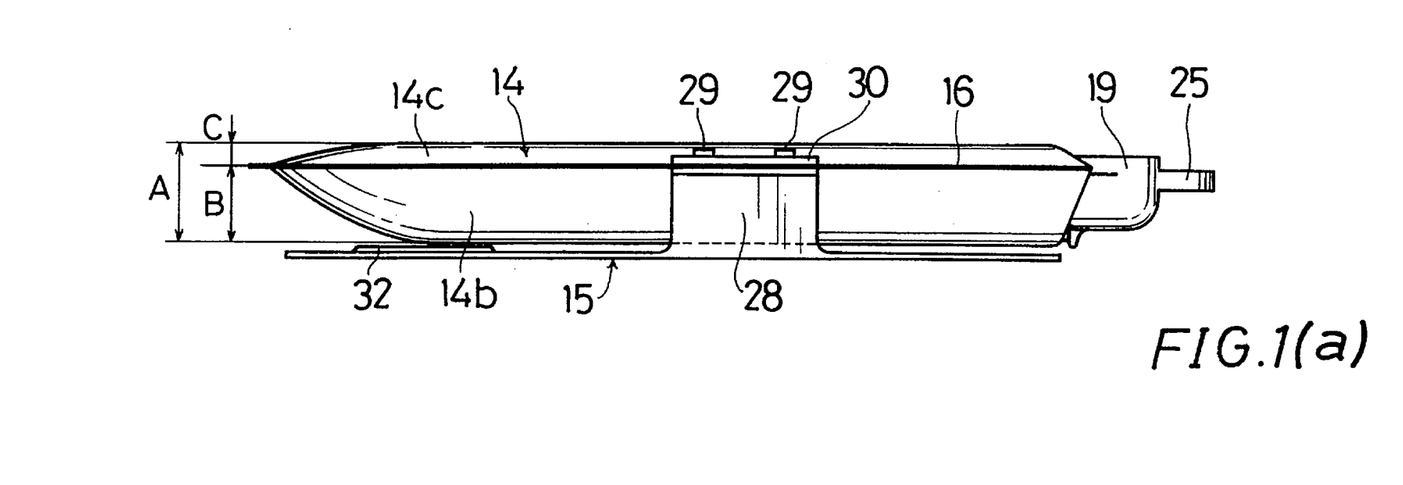
FIGS. 1(a) and 1(b) are views illustrating a filter according to an embodiment of the invention.
Figure 1B:
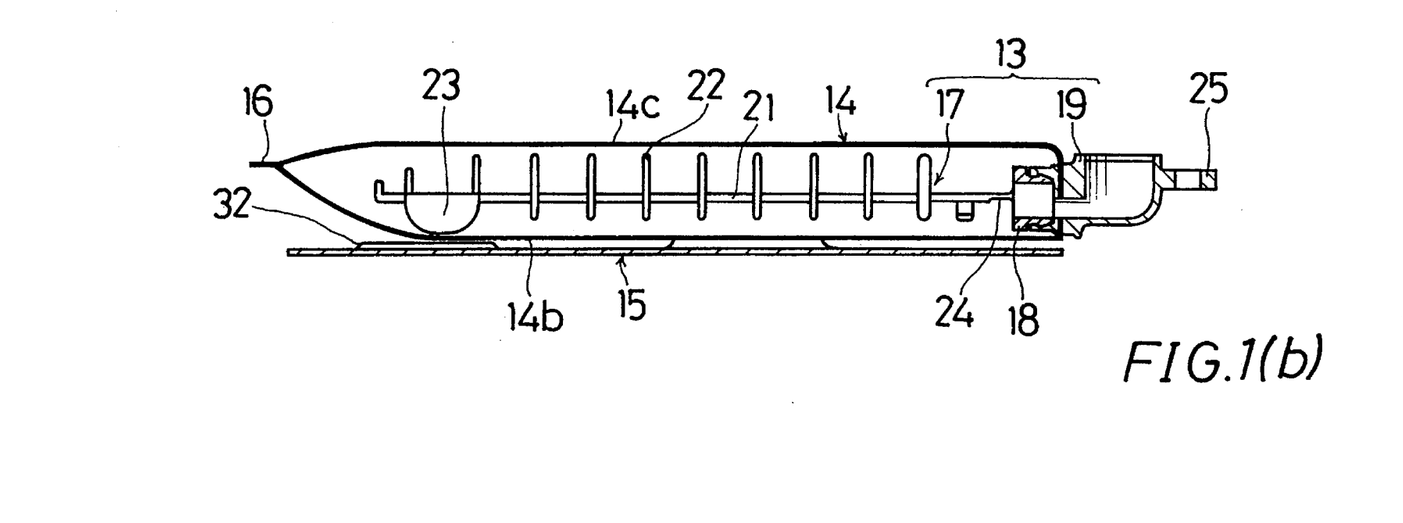
Figure 2:
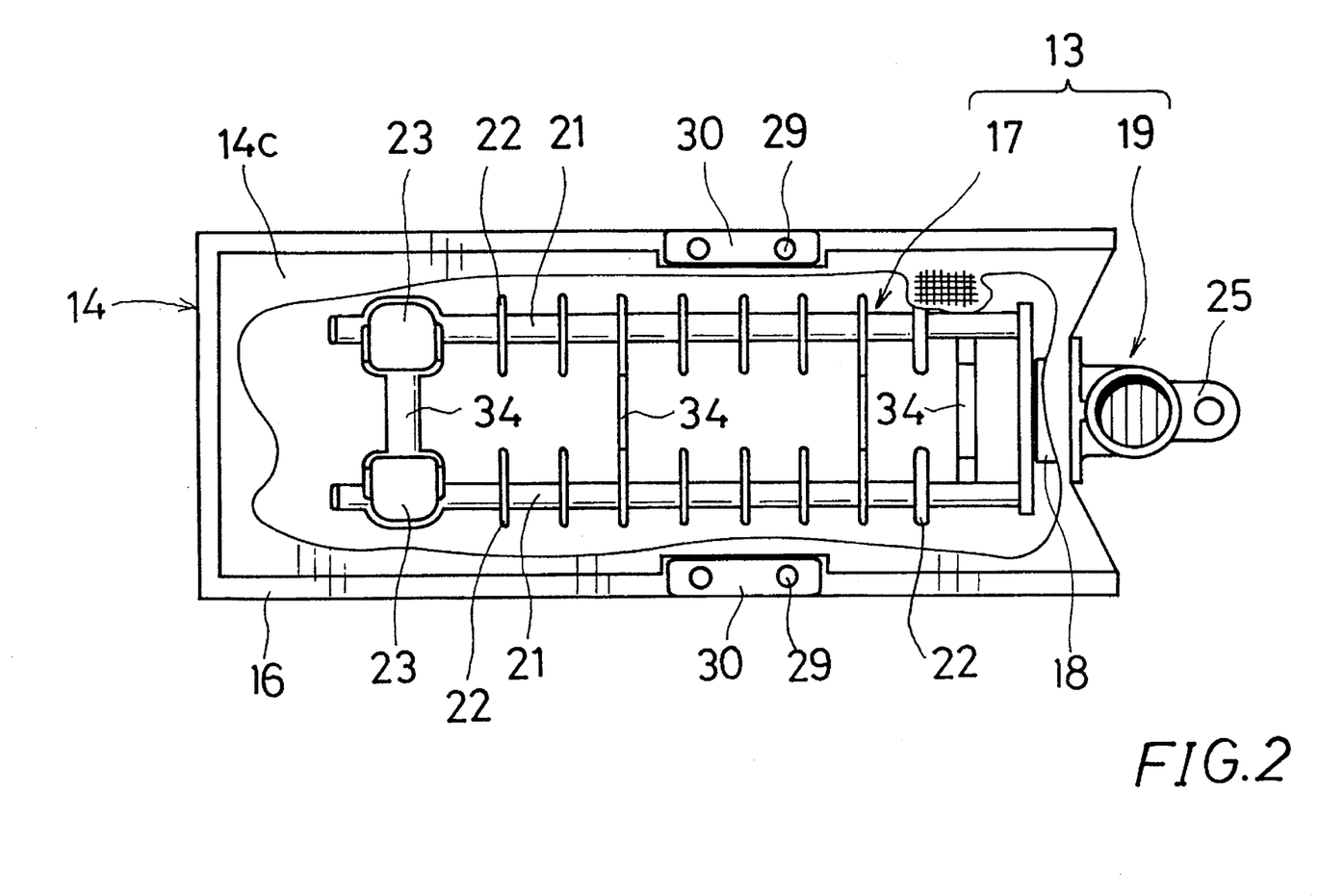
FIG. 2 is a partially sectional plan view of the filter in FIG. 1.
Figure 3:
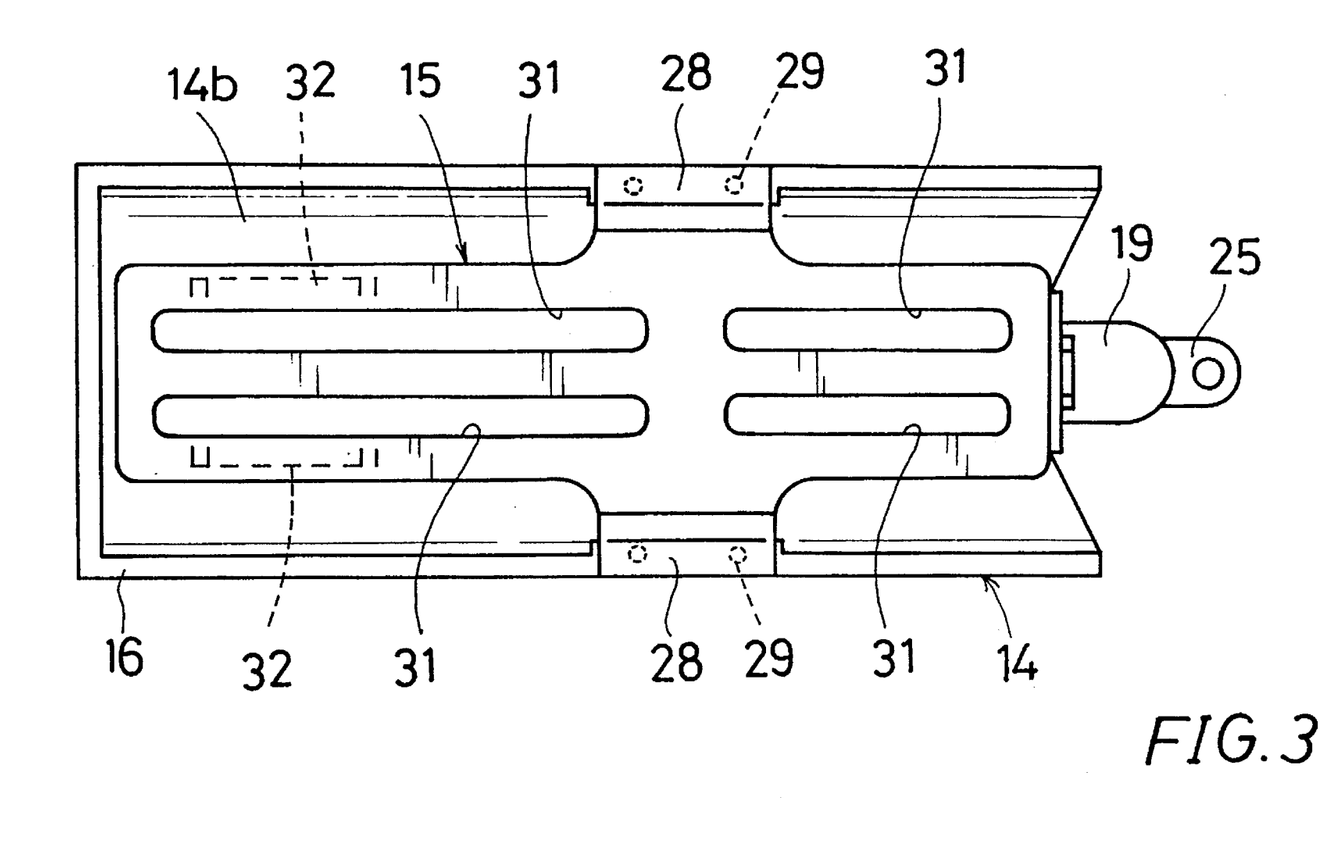
FIG. 3 is a bottom view of the filter in FIG. 1.

Now, the description will be related to the filter 12 of the fuel pump 8. FIG. 1(a) is a side elevational view of the filter, and FIG. 1(b) is a sectional view thereof. FIG. 2 is a partially sectional plan view of the filter, FIG. 3 is a bottom view thereof, and FIG. 4 is a front view thereof.

As shown in FIGS. 1 to 4, the filter 12 includes a substantially rectangular frame 13 to be mounted on the fuel pump 8, a bag type screen 14 to be kept in an expanded condition by the frame 13, and a flat protector plate 15 to be interposed between the screen 14 and a bottom surface 1a of the fuel tank 1.

The frame 13 is made of a synthetic resin material such as a nylon resin, and composed of an inner skeleton 17 which constitutes a main component of the frame inserted in the screen 14 and integrally formed at an end thereof with a cylindrical connecting pipe 18, and an elbow type mounting pipe 19 which is attached to the connecting pipe 18 through engaging means such as snap fitting. The inner skeleton 17 is composed of a band type main plate 21 extending in a longitudinal direction. The main plate is coupled at one end with the connecting pipe 18 through a thin portion 24, holding pieces 22 are projecting vertically from the upper and lower surfaces of the main plate 21 at regular intervals, a presser portion 23 is provided at the other extreme end of the main plate 21 and projecting from the lower surface thereof. As shown in FIG. 2, the filter is provided with a pair of such main plates 21 extending parallel to each other and including respective main plates 21, presser portions 23 and holding pieces 22 which are interconnected by connecting members 34, respectively. The mounting pipe 19 is formed with a fixing piece 25 to be fixed onto a pump body of the fuel pump 8 by a snap ring or the like.

The screen 14 is made of a synthetic resin material such as a nylon resin in the form of a mesh having a size suitable to filter fuel and has good flexibility. The screen 14 is formed in a bag by inserting the central portion of a fold edge of the screen which is folded in half in the mounting pipe 19, securing the connecting pipe 18 of the inner skeleton 17 to the mounting pipe 19, and joining a lower screen portion 14b and an upper screen portion 14c together by welding or heat bonding along the peripheral edges thereof to form a joint 16. When the height of the upper screen portion 14c is represented by C, and the height of the lower screen portion 14b is B, the joint 16 is located at such a level as to satisfy the relationship that C is smaller than B. The sum of the heights B and C is equal to the full height A of the screen 14.

The protector 15, which serves to eliminate or reduce the abrasion of the lower surface of the screen 14, is a substantially rectangular thin plate made of a synthetic resin material such as a nylon resin. As shown in FIG. 1(a), 2 and 3, the protector 15 is attacked to screen 14 at a substantially central portion in the longitudinal direction with supporting pieces 28 extending laterally from right and left sides of the protector 15. As shown in FIGS. 1 and 4, the support pieces 28 constitute a means for fastening the thin plate to the centrally located attachment portion of the filtering screen such that the lower surface of the filtering screen is spaced apart from the major upper surface portion of the thin plate best seen in FIG. 4, each of the supporting pieces 28 extends along the contour of the screen 14 and has an extreme end extending along the lower surface of the joint 16 of the screen 14, forming a nearly S configuration. The extreme end of the supporting piece 28 is attached to the corresponding portion of the joint 16 of the screen 14 in the following manner. As shown in FIG. 5 which shows the attachment in section, the extreme end of the supporting piece 28 of the protector 15 has a pair of integrally formed pins 29 projecting from the upper surface thereof. The pins 29 which are, prior to riveting, in a form as illustrated by phantom lines in FIG. 5 are inserted through corresponding holes (not represented by reference numbers) of the joint 16 and further through corresponding holes (not represent by reference numbers) of band type retaining plates 30 placed on the edges, and then the extreme ends of the pins 29 are riveted by ultrasonic wave or heating, as shown by solid lines in FIG. 5. The riveted end of the pin 29 in FIG. 5 is represented by 29a.

As shown in FIG. 3, the protector 15 has elongated openings 31. Furthermore, as shown in FIGS. 1 and 4, the protector 15 has at the extreme end thereof raised bearing portions 32 corresponding to the respective presser portions 23 of the inner skeleton 17.

The filter 12 is attached to the fuel pump 8 by fitting the mounting pipe 19 to the suction port of the fuel pump 8 and securing a fixing piece 25 onto the pump body by a snap ring, as shown in FIG. 6. It should be noted that the filter 12 prior to installation in the fuel tank extends substantially at right angles with respect to the fuel pump 8 as shown by phantom lines in FIG. 6. On installation of the pump assembly in the fuel tank 1, the filter 12 is forcedly bent as shown by solid lines in FIG. 6, with the protector 15 interposed between the screen 14 and the tank bottom surface 1a. At this time, as the inner skeleton 17 of the frame 13 is bent at the thin portion 24, both the main plate 21 of the inner skeleton 17 and the screen 14 are also bent, but not the protector 15.

In the filter 12 of this construction, as the protector 15 is attached to the flexible screen 14, the protector 15 is free from bending deformation, even when the filter 12 is disposed in the fuel tank 1. Therefore, the protector 15 will not generate any such force to be applied against the tank bottom surface 1a as generated in the prior art, resulting in less transmission of vibration generated through operation of the fuel pump 8 to the fuel tank 1 and consequently reduction of vibrational noise. The force by which the whole filter presses the tank bottom surface 1a is equal to the sum of the bending forces of the frame 13 and of the screen 14, and it is smaller than that of the prior art filter by the bending force of the protector 15.

Furthermore, as the protector 15 is attached at the central portion in the longitudinal direction thereof to the screen 14, the protector 15, prior to installation, will not extend apart from the screen 14, improving efficiency of assembling operation to the fuel pump 8, insertion of the fuel pump 8 into the fuel tank 1 and others.

In the filter 12, the membrane length of the lower screen portion 14b of the screen 14 is greater than that of the upper screen portion 14c, providing greater allowance. Thus, when the filter 12 is bent by vibration or the like, the frame 13 will cause little stretching of the lower screen portion 14b. Therefore, as shown in the sectional view of FIG. 7, the presser portions 23 of the inner skeletons 17 of the frame 13 are pressed against the bearing portions 32 of the protector 15 with the corresponding portions of the screen 14 interposed therebetween, permitting bending of the filter almost free from supporting of the inner skeletons 17 by the lower screen portion 14b. Thus, the effective axial length L of the frame 13 is defined from the proximal end P of the main plate 21 to the abutting point R of the presser portions 23 against the protector 15. As the result, increase of the pressing load on the tank bottom surface 1a which occurred in the prior art filter can be avoided, causing less noise.

The protector 15 having the openings 31 is effective to prevent reduction of the filtering performance of the screen 14 in comparison with the one with no such openings. Thus, the openings improve performance.

The protector 15 is provided with the bearing portions 32 so as to receive thereon the presser portions 23 of the inner skeletons 17 of the frame with the corresponding portions of the screen 14 interposed therebetween, assuring a longer distance defined from the attachment to the fuel pump to the bearing portions and consequently less force applied by the frame 13 against the tank bottom surface 1a.

While the invention has been described with reference to a preferred embodiment thereof, it is to be understood that modifications or variations may be easily made without departing from the scope of the present invention which is defined by the appended claims.

What is claimed is:

1. A filter system for an in-tank type fuel pump which has a suction port and a discharge port for fuel, the filter system comprising:

a bag type filtering screen extending in a longitudinal direction from a suction port end to a far end with a centrally located attachment portion located centrally between the ends, a rectangular frame extending in the longitudinal direction, the frame being inserted into the filtering screen so as to keep the filtering screen in an expanded state, a rectangular shaped, thin plate extending in said longitudinal direction and including a major upper surface portion separated from the frame by a lower surface of the filtering screen to protect said lower surface of the filtering screen from abrasion, and means for fastening the thin plate to said centrally located attachment portion of the filtering screen such that the lower surface of the filtering screen is spaced apart from the major upper surface portion of the thin plate; and said thin plate being formed with a plurality of openings therein, which openings permit fuel flow to improve the filtering performance in comparison with the thin plate without openings.

2. The filter system of claim 1, further comprising said fuel pump and a fuel tank having a bottom face, wherein said fuel pump is connected to the filter system forming a unit which is inserted into a fuel tank, the filter system being attached to the suction port of the fuel pump, the frame and the bottom face of the fuel tank are biased toward each other by an elastic force generated therebetween, the filtering screen and said thin plate become sandwiched between the frame and the bottom face of the fuel tank, said thin plate protecting the screen from abrasion.

3. A filter system for an in-tank type fuel pump comprising:

a bag type filtering screen extending in a longitudinal direction from a fuel pump suction port end to an extreme end;

a rectangular frame extending in the longitudinal direction, said frame being inserted into the filtering screen for keeping it in an expanded state;

a protector plate having a major upper surface portion, attachment means for attachment to the filtering screen so that the protector plate is interposed between a lower surface of the filtering screen and a bottom surface of a fuel tank when inserted in a fuel tank and so that the lower surface of the filtering screen is spaced apart from the major upper surface portion of the protector plate;

said protector plate being formed with a plurality of openings therein, said openings permitting fuel flow and thus improved filtering performance; and said means for attachment being at a central portion of the filtering screen located between said suction port end and said extreme end.

4. The filter system as defined in claim 3 wherein said bag type screen is formed from a first mesh portion and a second mesh portion, each mesh portion having peripheral edges which are joined to each other, and said attachment means is fastened to joints formed by the peripheral edges.

5. The filter system as defined in claim 4 wherein said rectangular frame has opposed first and second ends, wherein said first end is mounted to the fuel pump suction port and said second end includes presser portions which extend in a first direction toward the first mesh portion;

said protector plate is formed with raised bearing portions which extend in a second direction toward the first mesh portion, said presser and bearing portions being located opposite each other.

6. The filter as defined in claim 3 wherein said bag type screen is formed from a first mesh portion to be above the frame, a second mesh portion to be below the frame and defining said lower surface portion of the filtering screen, the mesh portions having peripheral edges, the peripheral edges of the first and second mesh portions being joined to each other to form the bag, the height of the first mesh portion being represented by a value C and the height of the second mesh portion by a value B, a joint is formed and located at a level so as to satisfy the relationship C being smaller than B.

\* \* \* \* \*